United States Patent
Höppner et al.

[11] 3,938,760
[45] Feb. 17, 1976

[54] AIRCRAFT FOR SHORT LANDING AND TAKEOFF DISTANCE

[75] Inventors: Heinzjochen Höppner, Neukeferloh; Hans-Jurgen Schwärzler, Munich, both of Germany

[73] Assignee: Vereinigte Flugtechnische Werke-Fokker GmbH, Bremen, Germany

[22] Filed: Sept. 27, 1972

[21] Appl. No.: 292,636

[30] Foreign Application Priority Data
Oct. 5, 1971 Germany.......................... 2149590

[52] U.S. Cl.......................... 244/12 D; 244/42 DA
[51] Int. Cl.²........................................ B64C 15/06
[58] Field of Search........ 244/13, 12 R, 12 A, 12 D, 244/23 R, 23 D, 42 D, 42 DA, 42 R, 42 C, 42 DB, 42 DC, 40 R, 52, 53 R, 54, 55

[56] References Cited
UNITED STATES PATENTS

| | | | |
|---|---|---|---|
| 2,974,899 | 3/1961 | Fowler | 244/52 X |
| 3,260,477 | 1/1966 | Grahame | 244/42 D X |
| 3,285,538 | 11/1966 | Burnelli | 244/55 X |
| 3,614,028 | 10/1971 | Kleckner | 244/42 DA X |

FOREIGN PATENTS OR APPLICATIONS

| | | | |
|---|---|---|---|
| 1,212,391 | 3/1960 | France | 244/12 R |
| 1,053,573 | 2/1954 | France | 244/42 DB |

*Primary Examiner*—Trygve M. Blix
*Assistant Examiner*—Barry L. Kelmachter
*Attorney, Agent, or Firm*—Ralf H. Siegemund

[57] ABSTRACT

Aircraft for short landing and takeoff distance is provided with engines providing jet flow above the wing. Flap structure aft of the engine can be swung up on an axis near the trailing wing edge, to deflect jet flow in down direction.

4 Claims, 4 Drawing Figures

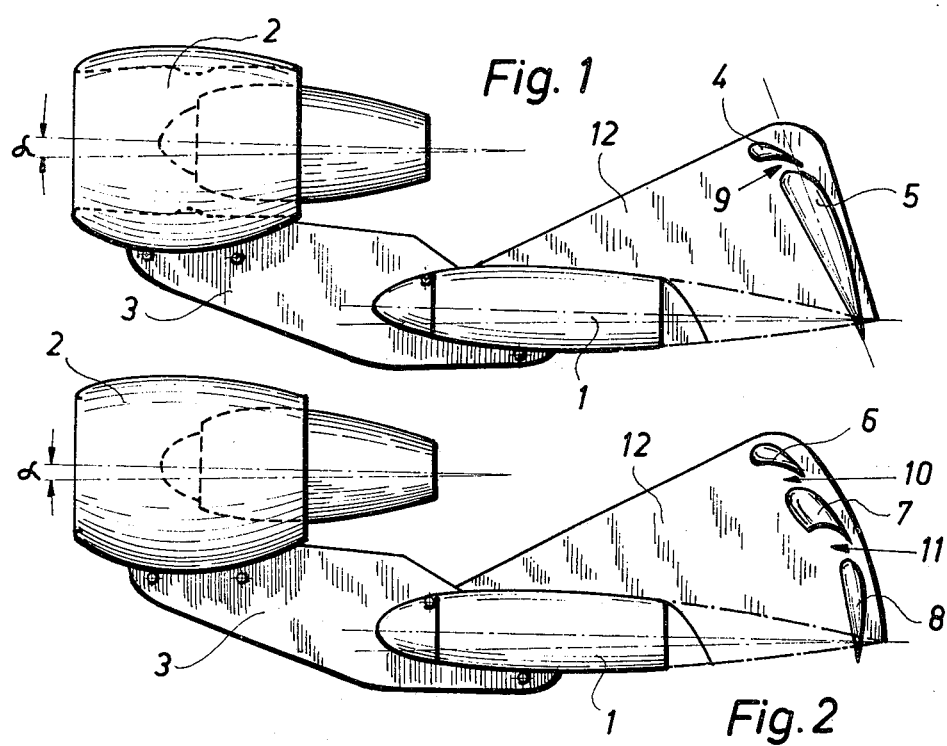
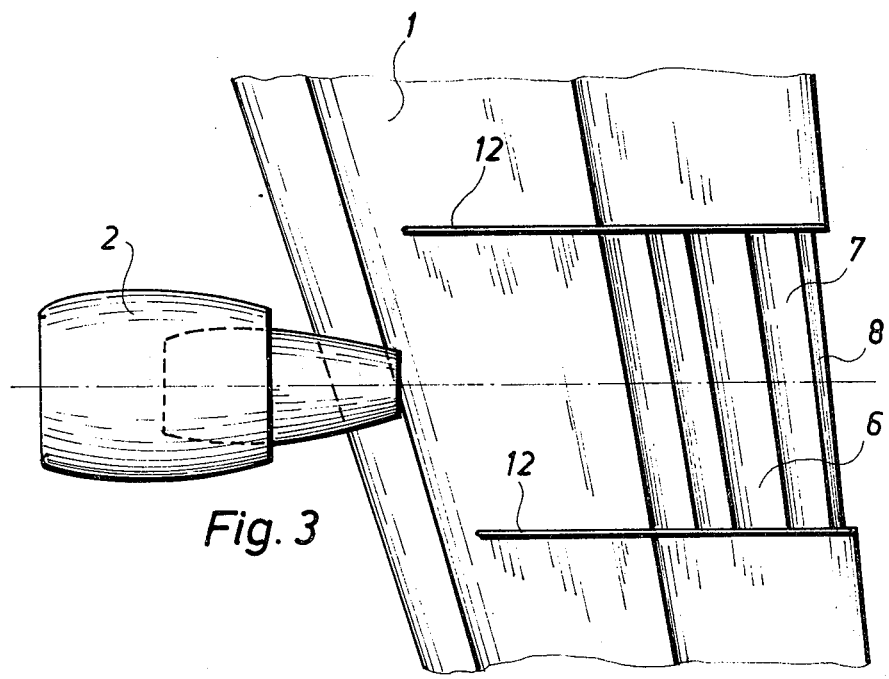

AIRCRAFT FOR SHORT LANDING AND TAKEOFF DISTANCE

BACKGROUND OF THE INVENTION

The present invention relates to improvments for aircraft, and more particularly, to improvements enabling the craft to start and land on short runways.

Aircrafts of this type are known per se. They have deflection flaps provided at the trailing edges of the wings, and these flaps are moved to deflect (or not to deflect) the thrust producing jets. The engines are disposed underneath the wings and the thrust producing jets as emerging from the engines are deflected so as to contribute to lift. Flaps with gaps are used here, and the deflected jets pass through the gaps from below, and the upper portion of the flap contributes likewise to the deflection. In order to obtain adequate operation, it is necessary that the jet be directed against the wing and gap from below. This requirement, however, has the disadvantage that the thrust producing engines must have a negative angle of attack which, in turn, increases the required deflection angle. Moreover, there will be some loss in effective thrust if the angle of attack is indeed a negative one. The known landing flaps do provide an increase of circulation at the wings but the resulting acceleration is effective only after the jet exits from the gap, and the jets on the underside of the wing profile provide opposing thrust.

DESCRIPTION OF THE INVENTION

It is an object of the present invention to take advantage of an increase in circulation by means of jets propagating along the upper side of the wings, and to deflect the jet for takeoff so that lift is directly produced therewith. The same equipment is to serve as drag resistance for landing on short runways. Therefore, it is an object of the present invention to improve the characteristics of airplanes constructed for short distance takeoff and landing.

In accordance with the preferred embodiment of the invention, it is suggested to mount the engines for producing jet flow along the upper side of the aircraft, as is known per se, and to construct the rear portions of the wings over which the jets pass as flaps. The flaps when swung up are placed thereby in the range of the jet flow from the engines on the upper side and deflect the jet when in down direction. The flap structure has its trailing edge pivoted on an axis near the trailing edge of the wing, so that the leading edge of the flap can be swung up from a position in the wing to a position in the flow of the jet.

As a consequence of these provisions, the jet can be deflected under reduction of the displacement of momentum, because the deflection occurs at a point close to the resultant air force during cruising. The wings depth is not increased; such increase would have the tendency of displacing the deflected thrust towards the rear. Moreover, upon practicing the principles of the invention, losses in thrust due to deflection are reduced, because the engines may have positive angle of attack relative to the horizontal direction of flight.

In accordance with a further feature of the invention, it is suggested to provide the flaps with gaps for passage of air. For guiding and focussing the thrust producing jet it is suggested further to provide laterally effective guide vanes on the wings and alongside the jets.

The flaps are to be swung up and down by linking the rearmost flap to the wing structure in the range of the trailing edge of the wing, and the flaps are mutually linked by means of levers for common extension and retraction. This way the flaps are moved continuously and fast during extension or retraction; acceleration shocks during flap operation are avoided.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side view of a jet deflector on a wing with two flaps;

FIG. 2 is a similar view but for thrust deflection by means of three flaps;

FIG. 3 is a top elevation of the engine and wing assembly of FIG. 2; and

FIG. 4 is a detail of the assembly in accordance with FIG. 1 on a somewhat enlarged scale and showing details of the actuator mechanism for the flaps.

DESCRIPTION OF THE DRAWINGS

Proceeding now to the detailed description of the drawings, the Figures show an aircraft wing 1 with an engine 2 mounted on a post 3 which extends from wing 1 forward and up, and mounts the engine to be effective above the wing. The jet as produced by the engine, thus, propagates completely above the wing, particularly during cruising.

The rear portion of the wing in the range and below the engine jet is constructed to have plural flaps. FIGS. 1 and 4 show two flaps 4 and 5; FIGS. 2 and 3 show three flaps 6, 7 and 8. The flaps are in swung-in position during cruising and constitute part of the wing.

Figure 4:
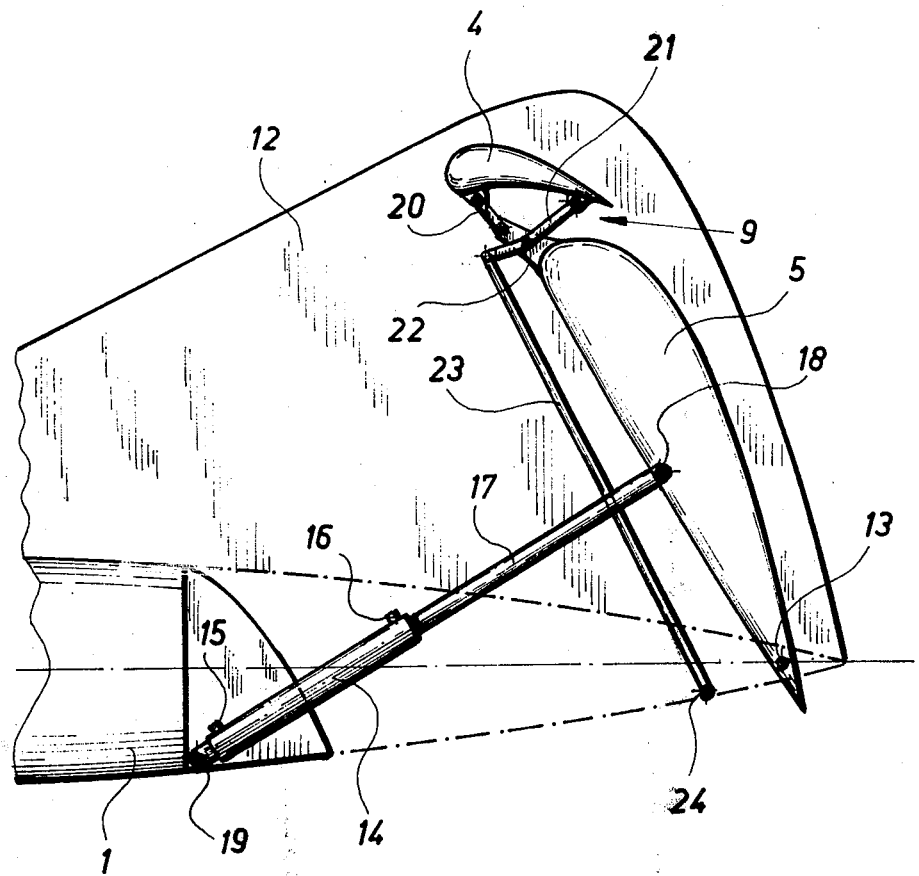

Upon takeoff and for landing, flaps 4 and 5 or 6, 7 and 8 are extended, i.e. the front part of the flap structure is swung up on a pivot point on the rear of the wing. The flaps when swung up provide for a laminated jet deflector, as they extend now into the range of the jet. Gaps 9, 10 and 11 are formed between the flaps as illustrated.

Guide vanes 12 are provided on the wing and to both sides of the jet, so that a laterally closed-off channel is established for the extended and swung-up flaps. The vanes restrict the aft flow of the engines laterally. The vanes extend sufficiently far towards the leading edge of the wing so that air next to the engine is sucked-in between the vanes by injector effect. That, in turn, adds to the lift as effective on the craft.

The several flaps are swung down and constitute part of the wing structure during cruising. During landing flaps 4, 5 and 6, 7, 8 are swung up again, so that the respective leading edges of the flaps are in the range of the jet flow of the engines. The flaps do not only deflect the thrust producing jet for obtaining lift, but the flaps increase drag resistance slowing down the craft accordingly. The flap angle of attack is somewhat larger for landing than for takeoff so as to obtain this additional drag.

As shown specifically in the drawings, the axis of engine 2 has a positive angle of attack $\alpha$ relative to the horizontal or line of flight so that the needed deflection angle for the flap structure is smaller than for zero $\alpha$ or even a negative value. The losses in thrust due to deflection are lower when a positive angle of attack is used for the jet engines as illustrated here.

As stated above, FIG. 4 shows details of the actuation and linkage of flaps 4 and 5. Linkage for flaps 6, 7 and 8 can be constructed analogously. The flap 5 has a pivot or turning point 13 near the trailing edge of wing 1. The pivot point is actually established at the wing and defines the pivot axis for the flap construction as a whole.

A hydraulic cylinder 14 is pivotally linked to wing 1 at point 19. The cylinder containes a piston and a piston rod 17, and can be protracted and retracted by hydraulic action for pivoting flap 5. Piston rod 17 is pivotally linked to flap 5 at 18. Reference numerals 15 and 16 denote the hydraulic connections of cylinder 14.

Flap 4 is linked to flap 5 by means of a lever 20 articulated to the respective two front ends of the flaps 4 and 5. The rear end of flap 4 is pivotally linked to one end of another lever 21. Lever 21 is pivotally supported on the front end of flap 5 at 22, to serve as two arm lever. The levers 20 and 21 establish a four-bar linkage. The other end of lever 21 is pivotally linked to one end of a lever 23 whose other end is pivoted on the wing at 24.

As a consequence of the linkage 20 to 24, flap 4 is turned into the illustrated position whenever flap 5 swings up by operation of piston rod protraction. Moreover, the change in position of flap 5 by means of the hydraulic device is a continuous one as between fully swung up and down positions. The flap 4 is likewise continuously positionable.

The invention is not limited to the embodiments described above but all changes and modifications thereof not constituting departures from the spirit and scope of the invention are intended to be included.

We claim:

1. In an airplane, the improvement for obtaining short takeoff and landing distance, comprising the combination of a jet flow emitting engine mounted on the upper side of a wing of the aircraft and in forward position so that the jet as rearwardly directed by the engine passes over and above the wing; and the wing being constructed to have flap means in the rear of the engine, the flap means being pivotable on an axis adjacent the trailing edge of the wing so that the front portion of the flap means swings up for being positionable in the range of the jet flow of the engine to obtain jet deflection in down direction along the lower side of the swung up flap means.

2. In an airplane as in claim 1, the flap means having plural flaps disposed to define gaps for air flow in between.

3. In an airplane as in claim 1, there being guide vanes on the wing for laterally restricting the jet flow aft of the engine.

4. In an airplane as in claim 1, the flap means having a first flap being pivotally linked to the trailing edge of the wing and at least another flap being linked to the first flap for being swung up together with the first flap and for opening a gap between them.

* * * * *